United States Patent [19]

Foley et al.

[11] Patent Number: 5,706,502
[45] Date of Patent: Jan. 6, 1998

[54] INTERNET-ENABLED PORTFOLIO MANAGER SYSTEM AND METHOD

[75] Inventors: Jill Paula Foley, San Jose; Karen Lynn Sielski, Sunnyvale, both of Calif.

[73] Assignee: Sun Microsystems, Inc., Mountain View, Calif.

[21] Appl. No.: 621,580

[22] Filed: Mar. 26, 1996

[51] Int. Cl.$^6$ .................................................. G06F 17/30
[52] U.S. Cl. ................................................ 395/610; 395/682
[58] Field of Search ....................................... 395/610, 682

[56] References Cited

U.S. PATENT DOCUMENTS

| | | | |
|---|---|---|---|
| 5,457,797 | 10/1995 | Butterworth et al. | 395/682 |
| 5,491,820 | 2/1996 | Belove et al. | 395/603 |
| 5,530,852 | 6/1996 | Meske, Jr. et al. | 395/610 |
| 5,537,586 | 7/1996 | Amram et al. | 395/603 |
| 5,600,831 | 2/1997 | Levy et al. | 395/602 |
| 5,630,127 | 5/1997 | Moore et al. | 395/615 |
| 5,649,186 | 7/1997 | Ferguson | 395/610 |

*Primary Examiner*—Wayne Amsbury
*Attorney, Agent, or Firm*—Douglas J. Crisman; Flehr Hohbach Test Albritton & Herbert LLP

[57] ABSTRACT

A portfolio management system (PMS) is disclosed that allows users to manage, create, edit, debug and compile software portfolios that can include several different types of components, or projects. For example, projects can be Java applets, standalone executable programs, image files, Java class libraries or remote Java applets. The software portfolios and/or their constituent projects can be stored on the system hosting the portfolio management system or on any remote system that can be accessed via the Internet using standard Internet communications protocols, such as FTP or HTTP. The PMS includes portfolio files, each of which includes links to the projects that compose a portfolio and project files that set out the attributes of one project. The PMS also provides portfolio methods that allow users to create, choose, import and remove entire portfolios and project methods that allow users to create, import, choose, edit, remove, run, copy and paste projects. The contents of a particular portfolio or project file determines how the PMS implements the aforementioned methods. For example, if a user wants to import a portfolio from a remote system, the PMS invokes an integrated Web browser, which downloads the desired portfolio onto the local system. The PMS also allows users to publish portfolios and projects on the Internet to be used by others within certain limits set by the publisher. For example, the publisher can restrict copying of source programs while allowing copying of executables.

35 Claims, 6 Drawing Sheets

INTERNET-ENABLED PORTFOLIO MANAGER SYSTEM AND METHOD

The present invention relates generally to file and program managers and particularly to a software development and file management system that enables users to create and work with portfolios of files that are distributed over the Internet.

BACKGROUND OF THE INVENTION

The present invention is an improvement to conventional programming and file management systems. These conventional systems allow users to create, organize and compile program components (e.g., program source files, class libraries, data files) from within a single, consistent environment. For example, a typical prior art programming environment might represent different programs as folders in a graphical user interface and a program's components as icons of different types in the program's folder. These conventional programming environments also provide ease of use features, such as allowing a user to copy one program component to another program's folder using simple menu or mouse commands.

These prior art software development and file management tools provide support for local program components, which are files that are stored on the system hosting the software development or file management system. For example, local program components might be files stored on different nodes of a local area network or files on a single standalone computer. However, the prior art systems are not Internet-enabled. I.e., they do not allow a user to assemble programs from components that are distributed on diverse Internet nodes or to download entire program folders from another Internet node. Moreover, the previous generation of software development tools do not facilitate the creation or importation of software components such as Java applets (stored locally or on an Internet node), which are an extremely important medium for distributing platform independent executable programs over the World Wide Web.

The World-Wide Web ("WWW") links many of the servers making up the Internet, each storing documents identified by unique universal resource locators (URLs). Many of the documents stored on Web servers are written in a standard document description language called HTML (hypertext markup language). Using HTML, a designer of Web documents can associate hypertext links or annotations with specific words or phrases in a document (these hypertext links identify the URLs of other Web documents or other parts of the same document providing information related to the words or phrases) and specify visual aspects and the content of a Web page.

A user accesses documents stored on the WWW using a Web browser (a computer program designed to display HTML documents and communicate with Web servers) running on a Web client connected to the Internet. Typically, this is done by the user selecting a hypertext link (typically displayed by the Web browser as a highlighted word or phrase) within a document being viewed with the Web browser. The Web browser then issues a HTTP (hypertext transfer protocol) request for the requested document to the Web server identified by the requested document's URL. In response, the designated Web server returns the requested document to the Web browser, also using the HTTP.

The standard HTML syntax of Web pages and the standard communications protocol (HTTP) supported by the WWW guarantee that any Web browser can communicate with any Web server. However, until the invention of the Java programming language and Java applets, there was no way to provide platform-independent application programs over the Internet and the WWW.

Important features of the Java programming language include the architecture-independence of programs written in the Java language, meaning that they can be executed on any computer platform having a Java interpreter, and the verifiability of the integrity of such programs, meaning that the integrity of Java programs can be verified prior to their execution. A Java program verifier determines whether the program conforms to predefined stack usage and data usage restrictions that ensure that verified programs cannot overflow or underflow the executing computer's operand stack and that all program instructions utilize only data of know data types. As a result, Java language programs cannot create object pointers and generally cannot access system resources other than those resources which the user explicitly grants it permission to use. Consequently, when one or more code fragments are downloaded to a client along with an associated form or image file, a Java-compatible browser running on the client will be able to verify and execute the downloaded code fragments needed to display the image or fill out the forms. However, no Java-compatible browser provides any kind of programming environment; instead, browsers are strictly directed to end users browsing existing HTML files and using the referenced Java applets and image files.

Thus, there is a need for an Internet-enabled programming environment that allows a user to assemble programs from components that are distributed on diverse Internet nodes or to download entire program folders from another Internet node. There is also a need for a software development tool that facilitates the creation or importation of software components such as Java applets (stored locally or on an Internet node). Ideally, such an Internet-enabled programming environment would be integrated with a Java-compatible Web browser so that any Internet and Web services required by the software development system could be performed by the Web browser.

SUMMARY OF THE INVENTION

The present invention is an improved software development and file management system that meets the needs set out above. More particularly, the present invention is a portfolio management system for portfolios of software projects that are distributed over a set of networked computers connected to the Internet. Portfolios and their constituent projects can be thought of as directories and files, respectively. This portfolio management system is resident on a first computer of the set of networked computers and includes a set of portfolio files, a set of project files, a portfolio manager and a Web browser.

In the preferred embodiment, a portfolio file represents one portfolio and includes respective references to members of a set of project files. Each of these references can be a file name when the project file member is local to the first computer or a Web page URL when the project file member is remote from the first computer. Each member of the set of project files specifies the attributes of one member of a set of projects associated with one portfolio via the associated portfolio file. The portfolio manager includes a set of user-selectable portfolio methods that are configured to process portfolios based on information in the associated portfolio files. The browser of the preferred embodiment is employed by the portfolio manager system to download to the first computer selected remote portfolio files from the Internet as those selected portfolio files are needed by the portfolio methods as they process portfolios.

The preferred embodiment can additionally include a user interface that is configured to display portfolios, including the projects composing the portfolios, in a consistent fashion that is independent of the location of the portfolios being displayed and their constituent projects. The portfolio manager user interface also is configured to enable user interaction with the portfolio methods so that the user can determine and manipulate the displayed portfolio using those portfolio methods.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
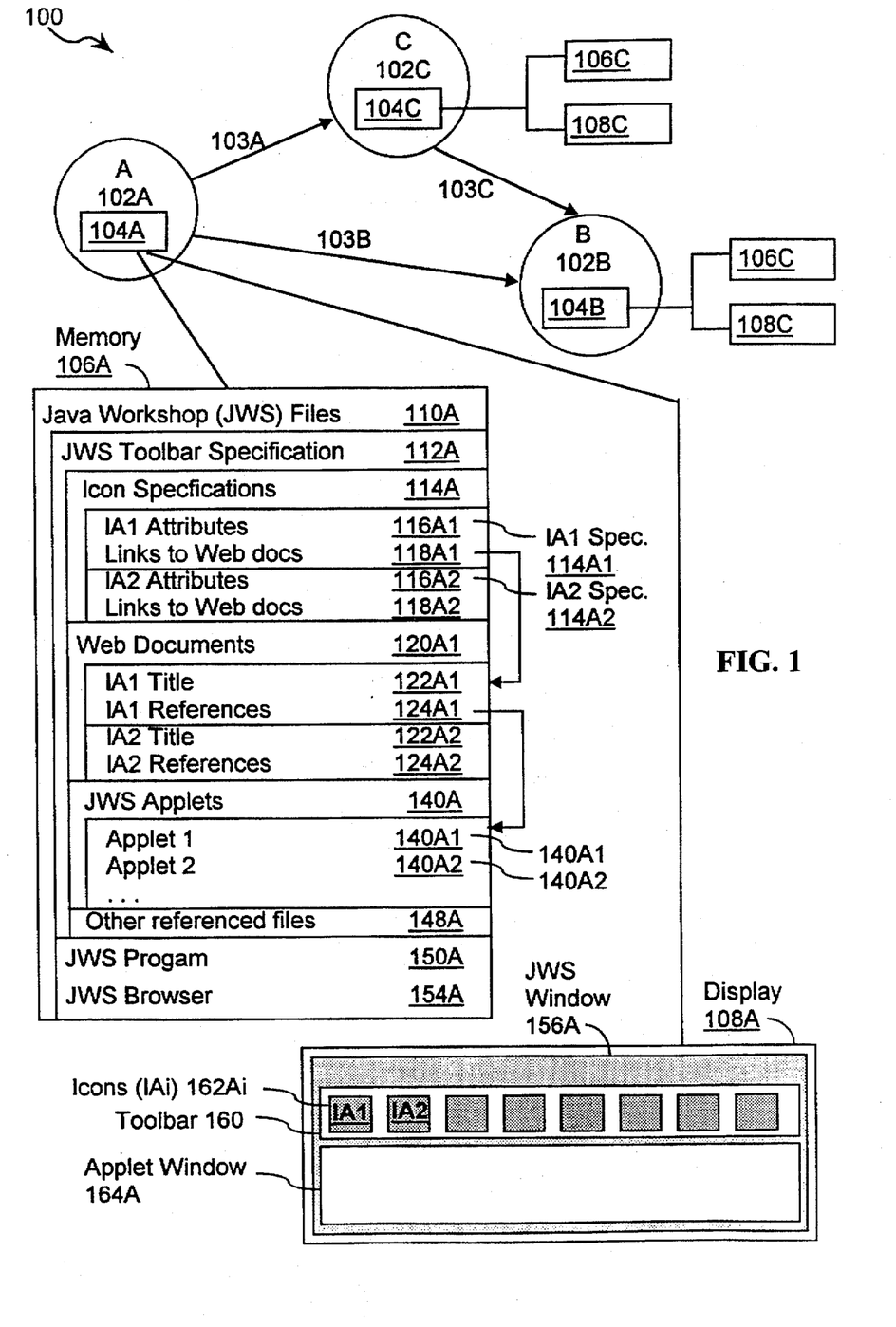
FIG. 1 is a block diagram of a computer network showing details of the memory and display associated with one of the networked computers.

Referring to FIG. 1, there is shown a computer network 100 with at least three computers: A 102A, B 102B and C 102C. Each computer 102 includes a processor 104, a memory 106, which could be a fast, primary memory (e.g., a RAM) or a slower, secondary memory (e.g., a hard disk drive), and a display 108. The computers 102 operate in accordance with well known computing principles (i.e., each computer 102 executes programs in its memory 106 under the control of an operating system (not shown), which provides system services for the executing programs). In the preferred embodiment, the interconnections 103 between the computers 102 are provided by the Internet, although the present invention is also applicable to any environment wherein networked computers can communicate using a standard communications protocol (such as HTTP) and wherein platform independent programs can be downloaded and executed over the network from within browser software. For the purposes of explaining the operation of the present invention, it is assumed that there is no network operating system that coordinates file exchange operations between the three computers A, B and C.

Details of the present invention are now described in relation to the particular implementation shown in FIG. 1. In this implementation, the user interface of the present invention is embedded within an application called the Java Workshop (JWS) program 150A, which, among other things, allows users to organize executable programs (Java applets and standalone executables) and non-executable files (image files and Java class libraries) into collections called portfolios. In a major departure from the prior art in the area of program and file managers, the JWS program 150A has an integrated JWS Browser 154A that allows a user seamlessly to create and work with portfolios that are remote (stored apart from the user's machine or local network) or local. Furthermore, the JWS browser 154A allows portfolios to be assembled that are mixtures of local and remote "projects".

The term "projects" is defined for the purposes of this document to mean the components of a portfolio.

The user interface of the present invention facilitates user interaction with mixed objects, such as a portfolio consisting of both local and remote projects, by providing a single paradigm for working with all objects regardless of the objects' locations. Of course, there are differences between working with remote and local objects. For example, executing a Java applet stored on a remote computer is a vastly different task from executing a standalone program stored locally. These differences are handled in the JWS program 150A. However, the user interface of the present invention allows a user to initiate the execution of the remote applet or the local program in the same way (e.g, by double-clicking an icon representing the applet). How the user interface of the present invention provides this location-transparency flexibility is now described in reference to FIG. 1.

Referring to FIG. 1, the memory 106A includes a set of JWS files 110A that collectively define the user interface, methods and data files that compose the Java Workshop (JWS). More specifically, the JWS files 110A include the JWS program 150 (hereinafter referred to as the "JWS"), JWS browser 154A and a group of interface files called the JWS toolbar specification 112A. The JWS toolbar specification 112A is composed of four sub-groups of files: icon specifications 114A, web documents 120A, JWS applets 140A and other referenced files 148A. The elements 114A, 120A, 140A, 148A specify the appearance and, more importantly, the operation of a set of icons (IAi) 162Ai that are displayed on the display 108A as elements of a JWS toolbar 160. The JWS toolbar 160, which is a key element of the JWS user interface, is displayed by the JWS program 150A on the JWS window 156A. The JWS window 156A also includes an applet window 164A that is controlled by JWS applets 140A that are executed by the JWS program 150A in the course of project and/or portfolio management.

Each icon IAi has a corresponding icon specification 114A that defines the icon's visual attributes 116Ai and specifies a link(s) 118Ai to a Web document(s) 120Ai that lists an initial set of files that are to be loaded and, possibly, executed whenever the icon IAi is selected. The links 118Ai can be to Web documents 120Ai that are stored on the local system (e.g, the computer 102A), in which case a link comprises a local path and file name that can be handled by the file service provided by the local operating system (not shown). The links 118Ai can also be to remote Web documents (e.g., documents stored on the computers 102B, 102C) that can be retrieved over the Internet by a conventional Web browser. Because the JWS program 150A incorporates a JWS Browser 154A that provides all of the features of a conventional Web browser, it does not matter where the Web document(s) 120Ai linked to a particular icon IAi are stored, nor does it matter on what type of platform the linked documents are stored. What is important to the preferred embodiment is that the JWS browser 154A is able to communicate with the remote platform hosting the Web document 120A1 via one of the standard communications protocols supported by the Internet, such as HTTP or FTP. If this is the case, the linked Web documents 120Ai will be automatically downloaded by the JWS browser 154A (triggered by the JWS program 150A) whenever their corresponding icon is selected. This eliminates many of the complexities that would be required in the prior art to implement a similar feature linking icons to remote, executable documents.

Each Web document 120A (which could have initially been stored locally or remotely before being loaded into the memory 106A) includes two elements: a title 122Ai and a set of references to its components 124Ai. A Web document 120A can also include embedded files (not shown); however, as Web browsers do not make a functional distinction between embedded and referenced files, neither will this application. As with the links 118Ai, the references 124Ai in the Web documents 120A can be to remote or local files. In either case, they are handled by the JWS browser 154A in the same manner as described for the links 118Ai. One significant advantage of the present user interface is that a reference 124Ai can be to a Java applet 140Ai that is responsible for handling the operations associated with the icon IAi whose related Web document referenced the applet 140Ai. In this situation, when the JWS browser 154A retrieves the web document 120Ai linked to a selected icon IAi, it automatically will pull in and begin executing the referenced applet 140A (which could have been stored on a remote system). The applet 140Ai, running in the JWS browser's virtual machine, can then implement the icon's associated operations without needing to worry about network and operating system complexities, which are handled respectively by the local operating system and the JWS browser 154A.

In the preferred embodiment, a single JWS applet 140Ai is referenced in each Web document 120Ai. This single applet controls or directly implements all of the functions associated with one icon IAi. For example, in the preferred embodiment, a spell checker icon IA1 could be linked via a Web document 120A1 to a remote applet 140A1 that, once downloaded to the computer 102A and executed by the JWS browser 154A, spell-checks the appropriate document(s). Alternatively, a Web document 120Ai can reference many applets 140Ai. For example an icon IA2 could be linked to a Web document 120A2 that references a spell-checker applet and a grammar-checker applet so that both are automatically brought up by the JWS browser 154A whenever the icon IA2 is selected from the toolbar 160. In addition to applets, a Web document of the present invention can reference other types of components 148A, including data and image files.

Figure 2:
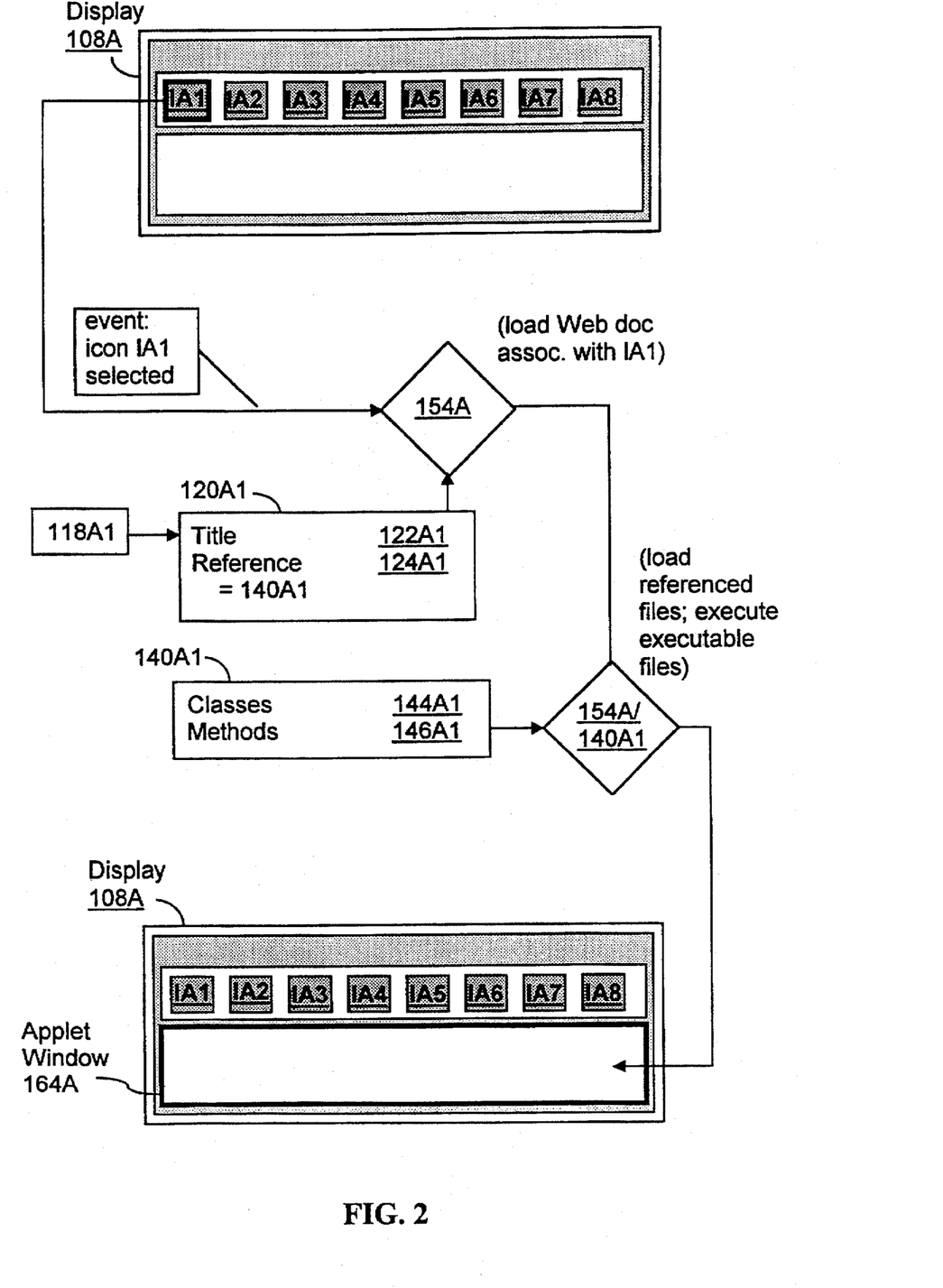
FIG. 2 is a data flow diagram illustrating the processing steps performed by the present invention following the selection of an icon from the toolbar.

Referring to FIG. 2, there is shown a data flow diagram illustrating the series of steps by which an applet is invoked in response to the selection of a particular icon IA1 from the toolbar 160. Each icon selection event is monitored by the JWS browser 154A, which, following the selection of the icon IA1, retrieves the link 118A1 from the icon IAi's specification file 114A1. Via the link 118A1, the icon IA1 is associated with the Web document 120A1, which is automatically loaded by the JWS browser 154A. The JWS browser 154A then loads all of the files referenced in the document 120A1 and also executes any of the referenced files that are executable (i.e., the applets). In this example, it is assumed that there is one referenced executable, the applet 140A1. Once it is active, the applet 140A1 can take control of a portion of the display 108A (e.g., the applet window 164A), on which it can display results, dialog boxes and icons that facilitate user interaction with the applet's functions and capabilities.

Figure 3:
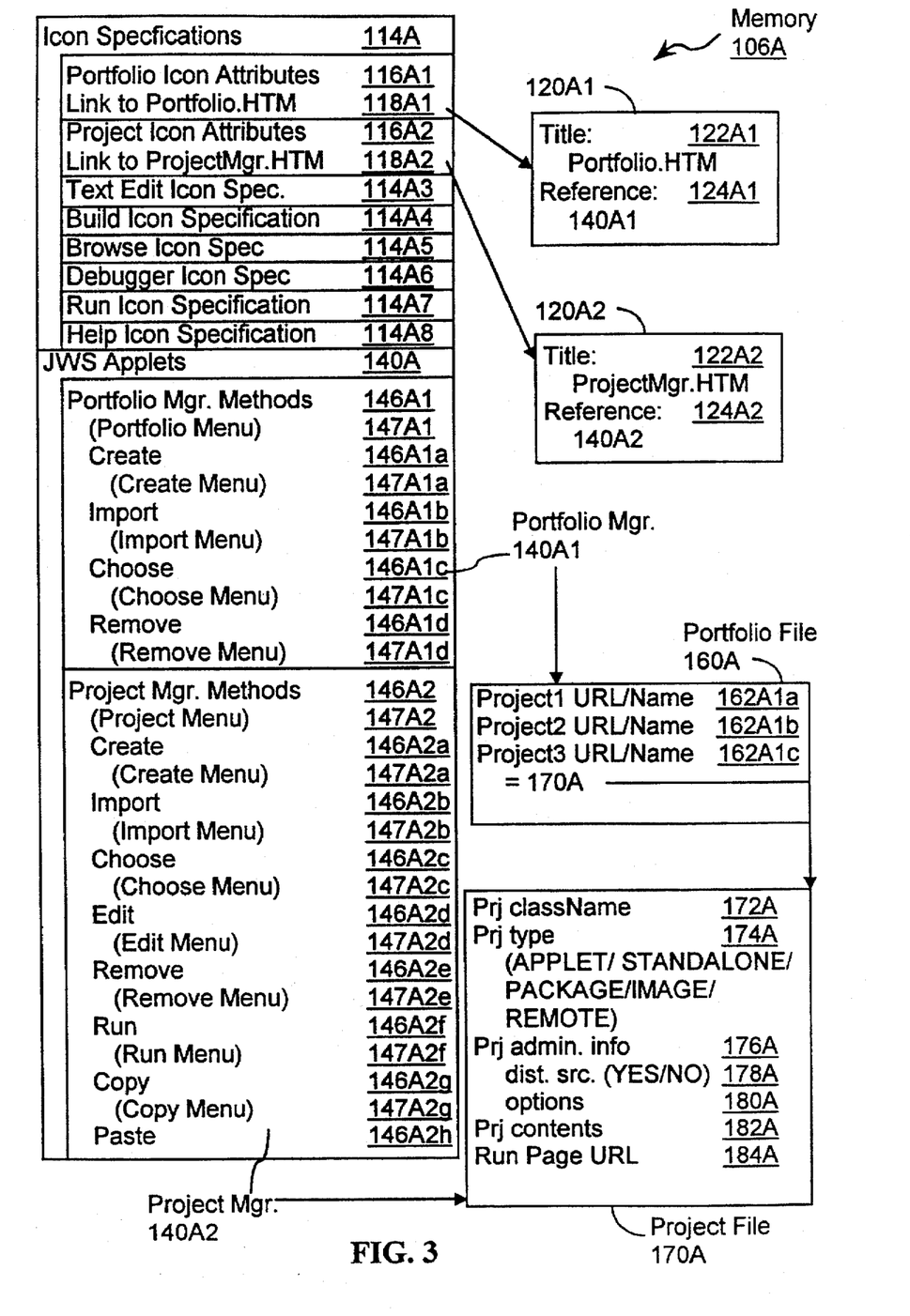
FIG. 3 is a figure showing the data structures employed in a preferred embodiment of the Java Workshop.

Referring to FIG. 3, there is shown a data structure diagram setting out additional details of data items stored in the memory 106A that are used by the Java WorkShop Program 150A. These data items include icon specifications 114Ai that define the visual attributes 116Ai and Web document links 118Ai for icons IAi displayed by the JWS 150A on the toolbar 160. These icons (shown on FIG. 2) include a portfolio manager icon IA1, project manager icon IA2, text edit project icon IA3, build/compile icon IA4, source browse icon IA5, debug icon IA6, run icon IA7 and help icon IA8. When selected, the icons IA1–IA8 respectively allow a user to access the following capabilities (and menus) provided by the Java WorkShop 150A for working with JWS portfolios and projects:

IA1: provides access to the portfolio manager applet 140A1, which displays the projects in the current portfolio;

IA2: provides access to the project manager applet 140A2, in which the user can edit project information;

IA3: provides access to a JWS text editor applet (not shown) in which the user can edit project source code;

IA4: provides access to a JWS project compiler applet (not shown);

IA5: provides access to a JWS browser applet (not shown) that allows the user to browse JWS source programs included in the other referenced files 148A;

IA6: provides access to a JWS debugger applet (not shown) that allows the user to debug JWS source programs included in the other referenced files 148A;

IA7: provides access to a JWS project run method 146A2f that runs executable projects (i.e., applets and standalone programs); and IA8: provides access to a JWS help applet (not shown) that provides context-sensitive help for JWS operations.

As described in reference to FIG. 1, in the preferred embodiment, an icon specification 114Ai includes a link to a Web document 120Ai that has a reference 124Ai to a single applet 140Ai that implements the operations associated with the corresponding icon IAi. Thus, the icon specification 114A1, which is associated with the portfolio manager icon IA1, is linked to a Web document ("Portfolio.HTM") 120A1 that includes a single reference 118A1 to the portfolio manager applet 140A1. Similarly, the icon specification 114A2, which is associated with the project manager icon IA2, is linked to a Web document ("Project.HTM") 120A2 having a single reference 118A2 to the project manager applet 140A2. These applets 140A1, 140A2 provide methods 146A1, 146A2 that can be applied respectively to portfolios and projects.

Figure 4:
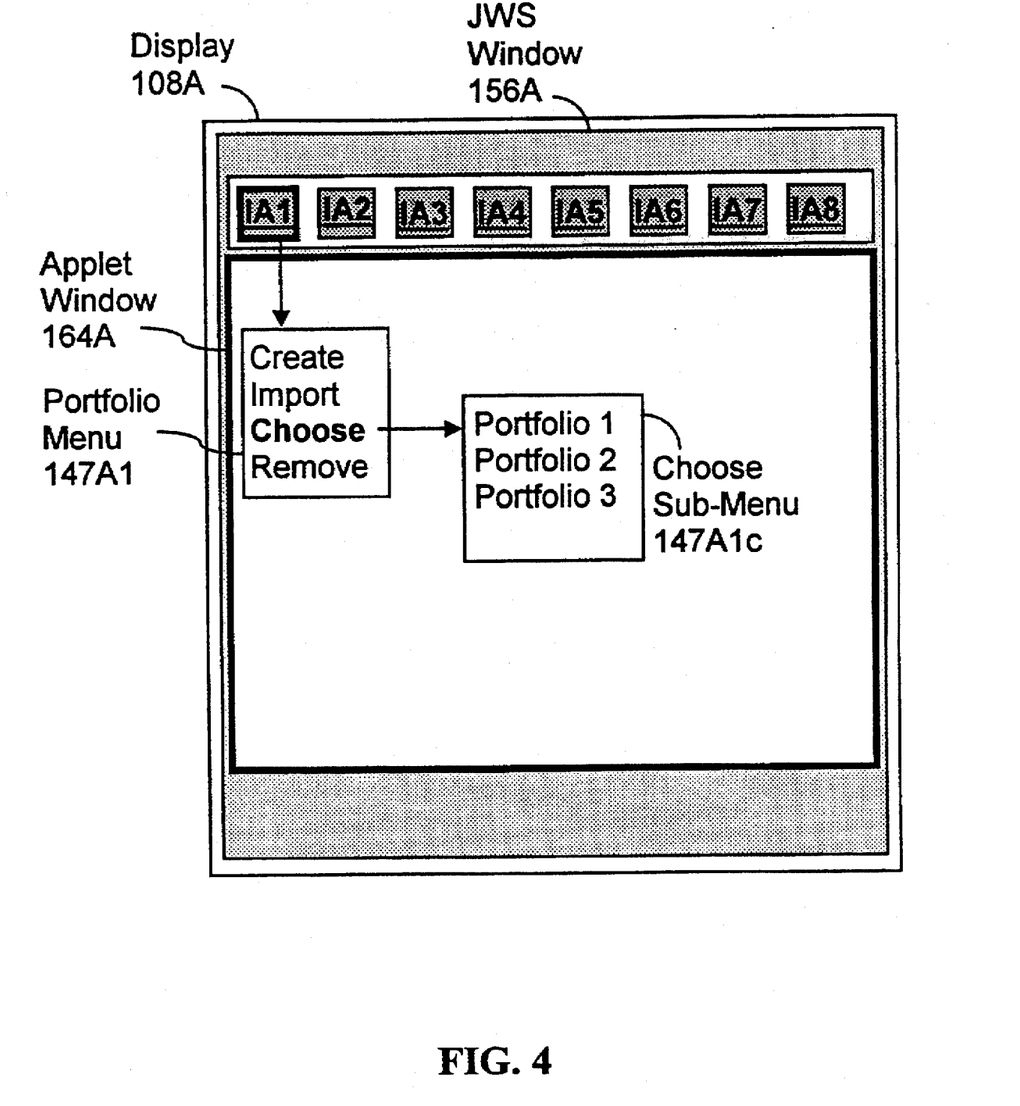
FIG. 4 shows instances of a portfolio manager menu and a submenu associated with one of the portfolio manager methods.

The methods 146Ai are made available to users as options on menus 147Ai that are displayed when their associated applet's icon is selected. For example, the portfolio managers method's 146A1 are displayed as options on a "Portfolio" menu 147A1. In conventional GUI fashion, when one of the methods/options is subsequently selected from its parent menu, that option's submenu, or page, is then displayed by the JWS 150A and enabled for user interaction. Many of the submenus 147Aij provided by the preferred embodiment; e.g., the Project->Create, Import, Choose, and Remove submenus 147A1a, 147A1b, 147A1c, 147A1d and the Project->Create, Import, Choose, Remove, Run and Copy submenus 147A2a, 147A2b, 147A2c, 147A2d, 147A2e, 147A2f respectively provide a list of portfolios and projects to which the submenus associated method can be applied. For example, referring to FIG. 4, there is shown an instance of the Portfolio->Choose submenu 147A1c listing a set of portfolios (Portfolio 1, Portfolio 2, Portfolio 3) for the Portfolio->Choose method 146A1c. FIG. 4 also shows the portfolio menu 147A1 listing the portfolio manager methods 146A1 (Create, Import, Choose, Remove).

Referring again to FIG. 3, the methods 146Ai of the JWS applets 140Ai are now described from the vantage point of a user working with their respective menus 147Ai and submenus 147Aij. Most of this discussion focuses on the methods of the portfolio and project manager applets 114A1, 114A2, which are key elements of the JWS 150A.

Portfolio Manager Methods

The portfolio manager applet 140A1 provides four methods 146A1 that respectively allow a user of the JWS 150A to "Create" 146A1a, "Import" 146A1b, "Choose" 146A1c and "Remove" 146A1d portfolios. Each of these methods 146A1 accomplishes its respective task by interacting with a set of portfolio files 160Ai, each of which can be stored on the local or remote systems and represents one portfolio. As shown in FIG. 3, a generic portfolio file 160A includes a collection of references 162A1i to its portfolio's constituent project files 170A. As with other file references in the present invention, a project reference 162Ai can be to a locally-stored project, in which case the reference is a local file name ("Name"), or to a Web document, in which case the reference is a URL.

Figure 5:
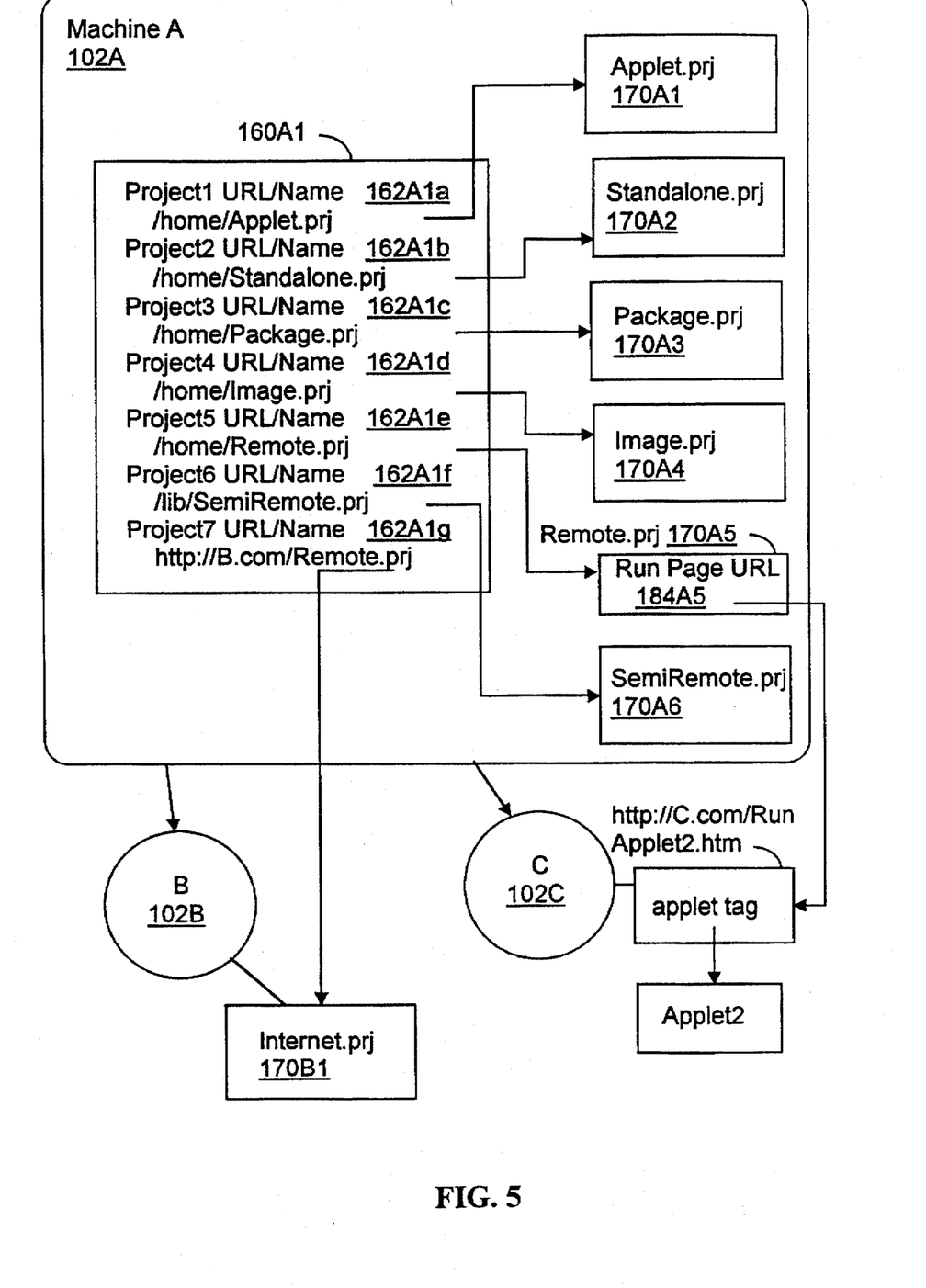
FIG. 5 shows the structure of a portfolio file that is employed in a preferred embodiment of the Java Workshop.

For example, referring to FIG. 5, there is shown a portfolio file 160A1 that contains project file references 162A1j for its constituent projects, which include an "Applet", a "Standalone" program, a Java "Package", an "Image" and a "Remote" applet, all of which are local projects stored in the user's "home" (i.e., local) directory in the memory 106A. Because these projects are all stored in the user's "home" directory, they can be read and written by the user and their corresponding project files can be referenced by path and file name. For example, the reference 162A1a to the applet project file 170A1 is "/home/Applet.prj". The portfolio file 160A1 also includes a reference 162A1f (/lib/SemiRemote.prj) to a project file for a read-only project ("SemiRemote") stored in a library directory on machine A and a reference 162A1g (http://B.com/Internet.prj) to a project file 170B1 for a read-only project ("Internet") stored on machine B that can only be accessed over the Internet using the JWS browser 154A.

Referring again to FIG. 3, in the preferred embodiment, each user has a personal portfolio (with a corresponding portfolio file 160Ai) that contains only the projects that belong to that user. When the JWS 150A is initially activated, it brings up the personal portfolio as the current, or active, portfolio. Using the portfolio manager's "Choose" method/option 146A1c, the user can choose another portfolio 160Ai to be the current portfolio. A user does this by selecting from the Portfolio->Choose submenu 147A1c (this terminology designates the Choose submenu that is displayed by the JWS 150A following the user's selection of the Choose option from the Portfolio menu 147A1) listing all available portfolios, the desired portfolio's file name (if it is local) or URL (if it is remote). The user can then view the projects composing the current portfolio by selecting the portfolio manager icon IA1 from the JWS toolbar 160. In this and other situations described herein, the applet being executed displays its results and menus on the applet window 164A.

A user of the JWS 150A can create a new portfolio by selecting the portfolio manager's "Create" option and then entering the name of the portfolio to be created. In response, the JWS 150A calls the Portfolio->Create method 146A1a, which creates the corresponding portfolio file 160A on the local system, displays its name in the toolbar 160A and adds the portfolio's name to the Choose and Remove submenus 147A1c, 147A1d. The newly-created portfolio has no projects, but the user can add projects in the Project->Create submenu 147A2a (described below) or import existing projects into the portfolio with the Project->Import menu item 147A2b (also described below).

Once the new portfolio has been created, its creator can keep it private or can publish it on the Internet to be accessed by others.

A user can also import existing portfolios that are not currently in their Portfolio->Choose submenu 147A1c. To import such a portfolio, the user first selects the Import option listed on the Portfolio menu 147A1. This triggers the Portfolio->Import method 146A1b to bring up an import submenu with a name field in which the user enters the file name or URL of the portfolio to be imported and an import button that the user clicks when they have completed their entries. In response, the import method 147A1c adds the portfolio name to the Portfolio->Choose and Portfolio->Remove submenus 147A1c, 147A1d; The JWS 150A also changes the current portfolio to the imported portfolio. Once it is on the Portfolio->Choose submenu 147A1c, the imported portfolio can be worked with like any other portfolio.

A user can remove a portfolio by selecting the portfolio to be removed from the Portfolio->Remove submenu. In response, the JWS 154A calls the Portfolio->Remove method 146A1d, which removes the selected portfolio from the Choose and Remove submenus 147A1c, 147A1d, but does not delete the portfolio's corresponding portfolio file 160A. Because the portfolio file is not deleted from the user's system, the user can at any time import the portfolio using the Portfolio->Import option 146A1b.

Each project file included in a portfolio has a corresponding project file 170A that describes the project and contains the project's contents. More specifically, each project file 170A contains the following information:

(1) the name 172A of the project;

(2) the project type 174A (Java applet (APPLET), standalone program (STANDALONE), Java class library (PACKAGE), data file (IMAGE), an imported copy of a remote project of one of these four previously described types, or a remote applet (REMOTE));

(3) project administration information 176A, including whether the source code for the project should be distributed 178A to others requesting the project over the Internet and project options 180A;

(4) the project contents 182A, which can include the actual project contents and/or a set of references to other project files 170Ai, enabling multiple levels of embedded projects; and (5) a run page URL 184A (applicable only for applet projects), which is the URL of the HTML file that includes an applet tag for the applet project.

This information determines which of the project methods provided by the JWS 150A can be employed by a user on a particular project. These project methods 146A2 are now described.

Project Methods

The JWS 150A provides several methods for working with projects. These methods are made available to users as options on a Project menu 147A2. When one of these methods/options is selected, the JWS 150A displays a corresponding submenu 147A2*j* from which the user specifies additional details of the operation. The project methods 146A2 include: Create 146A2*a*, Import 146A2*b*, Choose 146A2*c*, Edit 146A2*d*, Remove 146A2*e*, Run 146A2*f*, Copy 146A2*g*, and Paste 146A2*h*.

These methods allow a user to work with existing projects (local or remote) or create new projects. In either case, projects always exist in the context of a portfolio. When a project is created, it becomes the current project in the current portfolio.

A user can create a Java applet project, a standalone program project, a Java package project, an image project or a remote project. To create any of these projects, the user first "Chooses" the portfolio with which the project is to be associated and selects the "Create" option from the Project menu 147A2, upon which the JWS 150A calls the Project->Create method 146A2*a*. This method 146A2*a* displays the Project->Create page 147A2*a*, on which the user selects the type of project they wish to create (e.g., if the user wishes to create an applet, they click on an applet button displayed on the submenu). The user then specifies the name of the package to be created and the local directory in the memory 106A in which the package's corresponding project file 170Ai is to be stored. Once the user has specified the attributes for the project the Project->Create methods adds a reference 162Aij to the project's corresponding project file to the portfolio file 170Ai of the current portfolio 160Ai.

In some situations (when the project being created is an applet, standalone program or Java package) the user may also have access to source code for the newly-created project. In these situations, the user enters the file names of the corresponding source files on the Project->Create page 147A2*a*. The JWS 150A adds these source file names to a "Sources" list maintained in the memory 106A so the source files can be accessed by the user (e.g., for editing and compilation). The user also enters the name of the main file for the program (i.e., the file that contains the "main" routine) of which the newly created project is a part. When the project being created is a Java applet, it is possible that the Java applet is referenced in an HTML page so that, when the applet's reference is selected, the applet will be executed. The JWS 150A allows such relationships to be represented via a Run Page URL field in the Project-Create page in which the user optionally enters the name of the HTML page that executes the applet.

When the user is creating an image project, after Choosing "image" from the Project->Create submenu 147A2*a*, the user enters the name of the image project and the URL of the corresponding image file. The user can then optionally enter attributes associated with the image, such as:

(1) the image's alignment with respect to surrounding text (e.g., choosing "bottom" alignment causes a browser displaying the image to align the bottom of the image with the bottom of the text);

(2) whether the image is active (meaning that a person viewing the image can click on different regions of the image to produce different actions); and (3) an optional text string that can be displayed in lieu of the image by browsers that are not able to display the image.

Once the user has filled in this information for the image project they are creating, the user clicks on the "Apply" field of the Project->Create page 147A2*a*, upon which the Project->Create method 146A2*a* makes the newly created image project the current project and displays the image in the Applet window 164A. The Create method 146A2*a* also adds the image project name to the Choose, Edit and Remove submenus 147A2*c*, 147A2*d*, 147A2*e* in the Project menu 147A2 and adds the name of the corresponding project file 170Ai to the portfolio file 160Ai associated with the current portfolio.

A user of the JWS 150A can import any type of project into one of their personal portfolios. They do this by choosing the portfolio they wish to be the current portfolio, selecting the "Import" option from the Project menu 147A2 and then entering the name or URL of the project to be imported on the Project->Import page 147A2*b* that is displayed by the Project->Import method 146A2*b*. After entering the necessary information, the user clicks an "import" button displayed on the import page 147A2*b*, upon which the import method 146A2*b* imports the designated project into the current portfolio and adds the project name/URL to the Project->Choose, Edit, Remove and Run submenus 147A2*c*, 147A2*d*, 147A2*e* and 147A2*f*. The import method 146A2*b* also adds the name of the imported project's project file 170Ai to the current portfolio if it is not already contained therein. The JWS 150A does not make the imported project the current project, but the JWS 150A will display the imported project if the user subsequently selects the Portfolio Manager icon IA1 from the toolbar 160.

The JWS 150A allows a user to create a remote applet project. The user does this by "Choosing" the current portfolio, selecting the "Create" option from the "Project" menu and clicking the "remote applet" button displayed on the Project->Create submenu 147A2*a*. The user then enters the name of the project and the URL of the HTML page that executes the applet. Once these fields have been completed, the user exits the Project->Create submenu 147A2*a* by clicking on "Apply". The create method 146A2 then creates a project file 170Ai with empty contents 182Ai and a run page URL field 184Ai that is set to the URL of the HTML page that executes the applet. For example, referring to FIG. 5, the remote project file 170A5 has a run page URL 184A5 set to the URL ("http://C.com/RunApplet2.htm") of the Web page ("RunApplet2.htm") that runs the remote applet "Applet2". The create method 146A2 also adds the name of the project file 170Ai to the current portfolio's portfolio file 160Ai. The JWS 150A then makes the imported project the current project, loads the Portfolio Manager 140A1 and selects the current project to be displayed by the Portfolio Manager 140A1. The JWS 150A then adds the imported applet project's name to the Choose, Edit, Remove, Run and Copy submenus 147A2*c*, 147A2*d*, 147A2*e*, 147A2*f* in the Project menu 147A2.

A user can then run the remote applet by selecting its name from the Project->Run submenu 147A2*f* or by loading the Portfolio Manager, selecting the remote project and then pressing the Run button IA7 on the toolbar 160. The Project->Run method 146A2*f* then passes the URL of the Web page referenced in the run page URL field (e.g., 184A5) of the remote applet project file (170A5) to the Web browser 154A, which downloads the referenced Web page (http://C.com/RunApplet2.htm) and runs the remote applet (Applet2).

If a user does not specify a Run page URL 184Ai in an applet's project file 170Ai, that applet project can still be run using the Project->Run method 146A2*f*. In this situation, the Project->Run method 146A2*f* automatically generates a new Web page that contains an applet tag created with the project attributes and parameters entered by the user on the Edit Project 146A2*d* run folder. This automatically generated HTML page is loaded into the JWS 150A, which uses the browser 154A to run the applet project. This feature allows users to execute applets without having to know the HTML syntax for referencing applets.

The Copy method 146A2g of the Project Manager 140A2 allows a user of the JWS 150A to copy an applet into an HTML file that executes the applet without requiring the user to know the HTML syntax for referencing applets. The user does this by first selecting (single-clicking on) an applet project in the current portfolio and then selecting the Copy option from the Project menu 147A2. This set of actions causes the Copy method 146A2g to copy the contents 182Ai of the selected applet project to a clipboard (not shown) maintained by the JWS 150A. The user then selects the Text Editor Icon IA3 from the toolbar 160A, upon which the JWS 150A executes the Editor method 146A2d. The editor method 146A2d brings up a text editor containing an Edit menu 147A2d, which includes a list of editing options, including "Paste". The user selects the "Paste" option from the Edit menu 147A2d, upon which the paste method 142A2h pastes the contents of the clipboard (i.e., the applet being copied) into a new file. The user can then save the new file as an HTML file, which causes the JWS 150A to add to the saved HTML file the appropriate links to the copied applet. As with other new projects, the JWS 150A adds the file name of the new HTML file 170Ai to the current portfolio's portfolio file 160Ai. Alternatively, the user can simply drag the image of the applet to be copied onto the image of an HTML file they wish to include the applet. The JWS 150A will then copy the contents of the applet to the designated HTML file and add to the HTML file tags referencing the copied applet.

The Project->Edit method 146A2d also allows a user to edit projects of all types. The Edit method 146A2d can be invoked by a user of the JWS 150A in one of two ways. First, the user can click on the Edit Project icon IA3 displayed on the toolbar 160 to invoke editing (i.e., the editing method 146A2d) on the current project. Second, the user can select the name of the project to be edited from the Project->Edit submenu 147A2d. Once editing is selected for a designated project, the JWS Editor method 146A2d opens an edit page 147A2d that includes six folders in which the user can edit information for the designated project. These six folders and their associated information include:

| | |
|---|---|
| General | information about the project, including name, type and source directory |
| Build | information needed to compile the project |
| Debug/Browse | Information needed to debug and browse source files |
| Run | information needed to execute an applet or standalone program in the JWS Browser; |
| Publish | information needed to allow the project to be copied by other users; and |
| Portfolio | Portfolio information needed to display the project in the Portfolio Manager. |

The project->edit method 146A2d allows a user to edit fields in these six folders only where appropriate. To assist the user, the edit method 146A2d greys out inapplicable fields. Whether or not a field is applicable depends on the type of the project being edited and whether the project is local or remote. For example, the edit method 146A2d will not allow a user to edit fields in the Debug/BBrowse folder for a project that is not a source file. The information that can be entered by a user in the General, Build, Debug/Browse and Run folders is mostly conventional, so it is not described in great detail. However, what is unique about the editing information in these folders is that the JWS 150A allows users to provide information for remote as well as local projects identified by file names or URLs. This allows a user to specify, for example, that the source code for a particular project to be debugged or browsed exists on some remote node. This is not possible in conventional program and file management systems.

Because the preferred embodiment of the JWS 150A allows a user to employ portfolios and projects from remote sources and to publish their own portfolios and projects for others' use, this embodiment also provides a way for creators of a project to indicate certain attributes of a project that are relevant to publication of a project on the Internet. These publication attributes are contained in the Publish and Portfolio Folders, which include the following fields:

| Portfolio Folder | |
|---|---|
| Description | a brief description of the project that is displayed by the JWS Browser when the mouse is positioned over the project image in the Portfolio Manager; |
| Portfolio image URL | the URL for the image file (GIF, JPEG, or other) that represents the project image in the portfolio (If no image file is specified, a default GIF file is used by the JWS 150A); and |
| Features | the general characteristics of the project, for example, whether the project is video, graphics or audio. |
| Publish Folder | |
| Distribute source copies | a toggle field with two values (YES/NO) that controls whether the project's source files are copied when the project is copied from one portfolio to another (when this field is set to NO, the JWS only allows the corresponding project files 170Ai to be copied absent the contents 182A); and |
| Submitter Name, E-Mail and URL | The name, e-mail address and Web page of the person adding the project to the portfolio. |

A user can change the current project (i.e., the project being worked with in the JWS 150A) in one of two ways. In the first, the user starts by selecting the Portfolio Manager icon IA1 from the JWS toolbar 160. This causes the JWS 150A to open a Portfolio display showing the projects of the current portfolio in the Applet Window 164A. The user then selects from the Portfolio display the project they want to be the current project. The JWS 150A makes the selected project the current project and displays the name of the current project on the JWS toolbar 160. Alternatively, the user can change the current project by choosing the project name from the Project->Choose submenu 147A2c.

The JWS 150A allows a user to remove a project from a portfolio in one of the following ways. First, in the portfolio manager display in the applet window 164A, the user can select the project they wish to remove and then click a Remove icon (not shown) provided by the Portfolio Manger 140A1. Alternatively, they can choose the name of the project to be removed from the Project->Remove submenu 147A2e. In either case, once the user has indicated the project to be removed, the Project->Remove method 146A2e removes the project from the Choose, Edit, Remove and Copy submenus 147A2c, 147A2d, 147A2e, 147A2g of the Project Menu 147A2. Note that the Project->Remove method 146A2e does not delete the removed project's project file 170Ai, This ensures that the user can subsequently import the project at a later time (using the Project->Import method 146A2b) if required.

Figure 6:
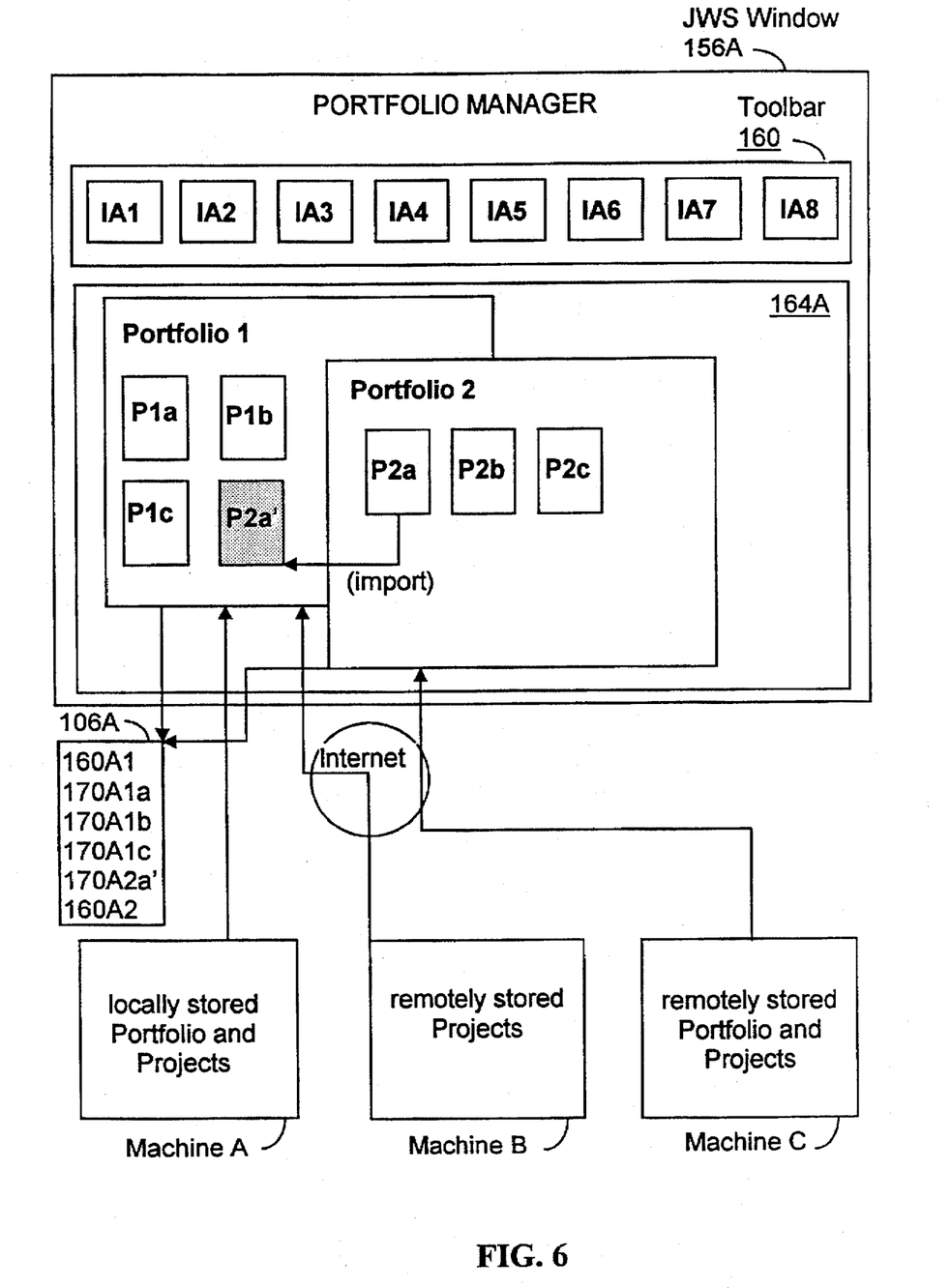
FIG. 6 is a depiction of a display window generated by the portfolio manager of the present invention where some of the displayed components are local or remote to the computer displaying the portfolio manager window.

Referring to FIG. 6, there is shown an illustration of the user interface of the JWS 150A that highlights the resulting advantages of the present invention. The eight icons IA1-IA8 of the JWS 150A are shown on the toolbar 160. Two portfolios (Portfolio 1 and Portfolio 2) are shown on the applet screen 164A, which is under control of the portfolio manager 140A1. These portfolios represent two of the different types of portfolios that can be accommodated in the JWS 150A. Portfolio 1 is a local portfolio with a portfolio file 160A1 that includes three local projects P1a, P1b, P1b with corresponding project files 170A1a, 170A1b, 1701c. The shaded project P2a' in Portfolio 1 is a remote portfolio that was imported from Portfolio 2 over the Internet by the JWS Browser 154A (FIG. 1) under control of the JWS 150A. This project P2a' is represented in the memory 106A by the project file 170A2a'. Even though Portfolio 1 is mixed, its projects all are manipulable in the same fashion in the JWS 150A.

Portfolio 2 is a remote portfolio whose components are also stored remotely. The JWS 150A accesses the components of Portfolio 2 over the Internet using the JWS browser 154A but displays Portfolio 2 in the same manner as Portfolio 1. Note that a local portfolio such as Portfolio 1 could also reference only remotely stored projects (e.g., projects stored on a machine B). This ability of the JWS 150A seamlessly to organize projects and portfolios that may be distributed over the Internet is due to the integration of the JWS 150A and the JWS Web browser 154A. The Internet-awareness of the present invention also enables users to publish their own portfolios so they can be accessed and used by others over the Internet.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A portfolio management system for portfolios of software projects that are distributed over a set of networked computers connected to the Internet, said portfolio management system being resident on a first computer of said set of networked computers and comprising:

a set of portfolio files, each of a subset of said set of portfolio files representing one portfolio and including respective references to members of a set of project files, said references being selected from a file name when said project file member is local to said first computer or a URL when said project file member is remote from said first computer;

each member of said set of project files respectively specifying project attributes of one member of a set of projects, said set of projects being the projects associated said one portfolio;

a portfolio manager including a set of user-selectable portfolio methods that are configured to process said portfolios based on information in said portfolio files; and a Web browser that is configured to download to said portfolio manager system selected remote portfolio files from the Internet as said selected portfolio files are needed by said portfolio methods to process said portfolios.

2. The system of claim 1, further comprising:
a user interface that is configured to:
   display said portfolios, including the projects composing said portfolios, in a consistent fashion that is independent of location of said portfolios and projects; and
   enable user interaction with said portfolio methods so that the user can determine and manipulate the displayed portfolio using said portfolio methods.

3. The system of claim 2, wherein a subset of said user-selectable portfolio methods comprises at least one of:

a create portfolio method that is used by said portfolio manager to create portfolios;

an import method that is used by said portfolio manager to import existing portfolios;

a choose portfolio method that is used by said portfolio manager to designate which one of said portfolios to work with; and a remove portfolio method that is used by said portfolio manager to remove portfolios.

4. The system of claim 3, further comprising:

a project manager including a set of user-selectable project methods that are configured to process said projects based on said project attributes in project files respectively associated with said projects;

said Web browser being further configured to download to said portfolio manager system selected remote project files from the Internet as said selected remote project files are needed by said portfolio methods and said project methods to process said projects; and said user interface being further configured to enable user interaction with said project methods so that the user can determine and manipulate displayed projects using said project methods.

5. The system of claim 4, wherein a subset of said project attributes comprises at least one of:

a project name field;

a project type field;

a project administrative information field;

a contents field; and a run page URL field.

6. The system of claim 5, wherein said project type field has a value that is selected from a group of predefined values including:

"APPLET", signifying that said contents represent a Java applet; and at least one of:

"STANDALONE", signifying that said contents represent a standalone executable program compiled to run on said first computer;

"PACKAGE", signifying that said contents represent a Java class library;

"IMAGE", signifying that said contents represent a data file; and

"REMOTE", signifying that said contents represent a remote applet.

7. The system of claim 6, wherein said contents field comprises at least one reference to a group of embedded project files.

8. The system of claim 6, wherein said contents field comprises contents of the project associated with said project file.

9. The system of claim 6, wherein a subset of said project methods comprises at least one of:

a project create method;

a project import method;

a project choose method;

a project edit method;

a project remove method;

a project run method;

a project copy method; and a project paste method.

10. The system of claim 9, further comprising:
a project menu including a set of selectable options, each of a subset of said set of selectable options corresponding to one of said subset of said project methods.

11. The system of claim 10, further comprising:
a project create submenu associated with the project create option on said project menu, said project create submenu being displayed by said user interface when a user selects said project create option, said project create submenu allowing said user to enter said project attributes for a new project;

a project choose submenu associated with the project choose option on said project menu, said project choose submenu being displayed by said user interface when a user selects said project choose option, said project choose submenu presenting a list of projects that can be chosen by said user;

a project remove submenu associated with the project remove option on said project menu, said project remove submenu being displayed by said user interface when a user selects said project remove option, said project remove submenu presenting a list of projects that can be removed by said user;

a project run submenu associated with the project run option on said project menu, said project run submenu being displayed by said user interface when a user selects said project run option, said project run submenu presenting a list of projects that can be run by said user; and a project edit submenu associated with the project edit option on said project menu, said project edit submenu being displayed by said user interface when a user selects said project edit option, said project run submenu presenting a list of projects whose project attributes can be edited by said user.

12. A method for use in a local computer connected via the Internet with a set of remote computers, said method enabling a user of said first computer to perform software development operations on software portfolios that are collections of projects, said method comprising the steps of:
displaying a set of software development icons, including a portfolio manager icon and a project manager icon;
enabling said user to select one of said icons;
executing a software development object corresponding to the selected software development icon, said portfolio manager and project manager icons being respectively associated with a portfolio manager software development object and a project manager software development object;
displaying a set of options associated with said executing software development object that correspond to said executing object's associated software development methods;
enabling said user to select one of said set of options associated with said executing software development object and to specify as said object's input a software entity selected from a portfolio or a project; said software entity not being constrained to be located solely on said local computer, and
executing said selected option's associated method on said selected software entity.

13. The method of claim 12, wherein said software development methods associated with said portfolio manager object comprise at least one of:
a portfolio create method;
a portfolio choose method;
a portfolio import method; and
a portfolio remove method.

14. The method of claim 13, wherein, when said selected option is associated with said portfolio create method, said step of executing said associated method comprises:
enabling said user to enter a new name and new location for a new portfolio; and
creating a new portfolio file corresponding to said new portfolio, said new portfolio having a name and location derived from said new name and new location.

15. The method of claim 13, wherein, when said selected option is associated with said portfolio choose method, said step of executing said associated method comprises:
displaying a choose submenu including a list of user-selectable portfolios;
upon said user selecting a particular portfolio from said choose submenu:
when said particular portfolio is remote, downloading a remote portfolio file corresponding to said selected portfolio via the Internet and enabling said user to work with projects referenced in said remote portfolio file;
when said particular portfolio is local, accessing a local portfolio file corresponding to said selected portfolio and enabling said user to work with projects referenced in said local portfolio file.

16. The method of claim 13, wherein, when said selected option is associated with said portfolio import method, said step of executing said associated method comprises:
enabling said user to enter a name and location for an imported portfolio, said location being selected from remote or local;
when said location is remote, accessing a remote portfolio file corresponding to said imported portfolio via the Internet and making said imported portfolio available to said user; and
when said location is local, accessing a local portfolio file corresponding to said imported portfolio and making said imported portfolio available to users.

17. The method of claim 13, wherein, when said selected option is associated with said portfolio remove method, said step of executing said associated method comprises:
displaying a remove submenu including a list of upon said user-selectable portfolios;
upon said user selecting a particular portfolio from said choose submenu, making said particular portfolio unavailable to users.

18. The method of claim 12, wherein said software development methods associated with said project manager object comprise at least one of:
a project create method;
a project import method;
a project choose method;
a project edit method;
a project remove method;
a project run method;
a project copy method; and
a project paste method.

19. The method of claim 18, wherein, when said selected option is associated with said project create method, said step of executing said associated method comprises:
displaying a project create menu on which said user enters attributes of a new project, said attributes including a project type name and location, said project type being selected from a predefined set of values including applet and at least one of standalone program, Java package, image file and remote applet;

writing said attributes to a new project file having a project file name and location that are derived from said project name and location;

when said project type is selected from said applet, standalone program or Java package values:

enabling said user to enter source code links to source code files associated with said new project; and writing said source code links to said new project file; and writing into a particular portfolio file associated with a particular portfolio of which said project is a component, said project name and project location so that said project can be accessed via said particular portfolio by said portfolio and project methods.

20. The method of claim 19, further comprising the steps of:

when said project type is entered by said user as said remote applet value, enabling said user to enter a project URL identifying a remote applet and a run page URL identifying the URL of an HTML page that includes an applet tag referencing said remote applet; and writing said project URL and run page URL to said new project file;

so that, when a user runs said new project using said run method, said HTML page identified by said run page URL is downloaded to and executed by said local computer, which, under control of said executing HTML page, downloads and runs said remote applet.

21. The method of claim 18, wherein, when said selected option is associated with said project import method, said step of executing said associated method comprises:

enabling said user to enter a name and location for an imported project, said location being selected from remote or local;

when said location is remote, accessing a remote project file corresponding to said imported project via the Internet;

when said location is local, accessing a local project file corresponding to said imported project; and adding a reference to the imported project's project file to a particular portfolio file associated with a particular portfolio of which said imported project is a component so that said imported project can be accessed from said particular portfolio by said portfolio and project methods.

22. The method of claim 18, wherein:

when said selected option is associated with said project copy method, said step of executing said associated method comprises:

copying contents of a first user-selected project to a clipboard; and when said selected option is associated with said project paste method, said step of executing said associated method comprises:

pasting contents of said clipboard into a second, user-specified project; such that, when said first user-selected project has a project type of applet and said copying step is following by said pasting step, said pasting step comprises writing said clipboard contents to said second project using an HTML applet tag.

23. The method of claim 18, wherein:

when said selected option is associated with said project run method, said stop of executing said associated method comprises:

enabling a user to select an executable project to be run; and when said executable project has a project type value of applet and has an associated project file that does not specify a run page URL for an HTML page that is configured to execute said executable project, generating a new HTML page containing an applet tag with tag attributes and tag parameters based on said project attributes of said executable project.

24. The method of claim 23, further comprising the step of:

running said new HTML page in said local computer, said local computer subsequently loading and executing said executable project under control of said HTML page.

25. In a set of networked computers connected to the Internet that includes a first computer and a subset of remote computers, a computer-readable memory configured to direct said first computer to process software portfolios that can be located on said remote computers and whose components, or projects, can be distributed across said remote computers, said computer-readable memory comprising:

a set of portfolio files, each of a subset of said set of portfolio files representing one portfolio and including respective references to members of a set of project files, said references being selected from a file name when said project file member is local to said first computer or a URL when said project file member is remote from said first computer;

each member of said set of project files respectively specifying project attributes of one member of a set of projects, said set of projects being the projects associated said one portfolio;

an executable portfolio manager object including a set of user-selectable portfolio methods that are configured to direct said first computer to process said portfolios based on information in said portfolio files; and an executable browser object that is configured to direct said first computer to download selected remote portfolio files from the Internet as said selected portfolio files are needed by said portfolio methods.

26. The computer-readable memory of claim 25, further comprising:

an executable user interface object that is configured to:

direct said first computer to display said portfolios, including the projects composing said portfolios, in a consistent fashion that is independent of location of said portfolios and projects; and direct said first computer to enable user interaction with said portfolio methods so that the user can determine and manipulate the displayed portfolio using said portfolio methods.

27. The computer-readable memory of claim 26, wherein a subset of said user-selectable portfolio methods comprises at least one of:

a create portfolio method that is used by said portfolio manager to create portfolios;

an import method that is used by said portfolio manager to import existing portfolios;

a choose portfolio method that is used by said portfolio manager to designate which one of said portfolios to work with; and a remove portfolio method that is used by said portfolio manager to remove portfolios.

28. The computer-readable memory of claim 27, further comprising:

a project manager including a set of user-selectable project methods that are configured to process said projects based on said project attributes in project files respectively associated with said projects;

said browser being further configured to download to said memory selected remote project files from the Internet as said selected remote project files are needed by said portfolio methods and said project methods to process said projects; and said user interface being further configured to enable user interaction with said project methods so that the user can determine and manipulate displayed projects using said project methods.

29. The computer-readable memory of claim 28, wherein a subset of said project attributes comprises at least one of:

a project name field;

a project type field;

a project administrative information field;

a contents field; and a run page URL field.

30. The computer-readable memory of claim 29, wherein said project type field has a value that is selected from a group of predefined values that includes:

"APPLET", signifying that said contents represent a Java applet; and at least one of:

"STANDALONE", signifying that said contents represent a standalone executable program compiled to run on said first computer;

"PACKAGE", signifying that said contents represent a Java class library;

"IMAGE", signifying that said contents represent a data file; and

"REMOTE", signifying that said contents represent a remote applet.

31. The computer-readable memory of claim 30, wherein said contents field comprises:

at least one reference to a group of embedded project files.

32. The computer-readable memory of claim 30, wherein said contents field comprises:

contents of the project associated with said project file.

33. The computer-readable memory of claim 30, wherein a subset of said project methods comprises at least one of:

a project create method;

a project import method;

a project choose method;

a project edit method;

a project remove method;

a project run method;

a project copy method; and a project paste method.

34. The computer-readable memory of claim 33, further comprising:

a project menu including a set of selectable options, each of a subset of said set of selectable options corresponding to one of said subset of said project methods.

35. The computer-readable memory of claim 34, further comprising:

a project create submenu associated with the project create option on said project menu, said project create submenu being displayed by said user interface when a user selects said project create option, said project create submenu allowing said user to enter said project attributes for a new project;

a project choose submenu associated with the project choose option on said project menu, said project choose submenu being displayed by said user interface when a user selects said project choose option, said project choose submenu presenting a list of projects that can be chosen by said user;

a project remove submenu associated with the project remove option on said project menu, said project remove submenu being displayed by said user interface when a user selects said project remove option, said project remove submenu presenting a list of projects that can be removed by said user;

a project run submenu associated with the project run option on said project menu, said project run submenu being displayed by said user interface when a user selects said project run option, said project run submenu presenting a list of projects that can be run by said user; and a project edit submenu associated with the project edit option on said project menu, said project edit submenu being displayed by said user interface when a user selects said project edit option, said project edit submenu presenting a list of projects whose project attributes can be edited by said user.

* * * * *

UNITED STATES PATENT AND TRADEMARK OFFICE
CERTIFICATE OF CORRECTION

PATENT NO. : 5,706,502
DATED : January 6, 1998
INVENTOR(S) : Jill Paula Foey, et. al.

It is certified that error appears in the above-identified patent and that said Letters Patent is hereby corrected as shown below:

Title page, item [22], replace "Filed: March 26, 1996 with --Filed: March 25, 1996--.

Signed and Sealed this

Second Day of June, 1998

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,706,502
DATED : January 6, 1998
INVENTOR(S) : Jill Paula Foley, et al It is certified that error appears in the above-identified patent and that said Letters Patent is hereby corrected as shown below:

Title page, item [22], replace "Filed: March 26, 1996" with
—Filed: March 25, 1996—.

This certificate supersedes Certificate of Correction issued June 2, 1998.

Signed and Sealed this

Fifteenth Day of December, 1998

Attest:

BRUCE LEHMAN

*Attesting Officer*  *Commissioner of Patents and Trademarks*